UNITED STATES PATENT OFFICE.

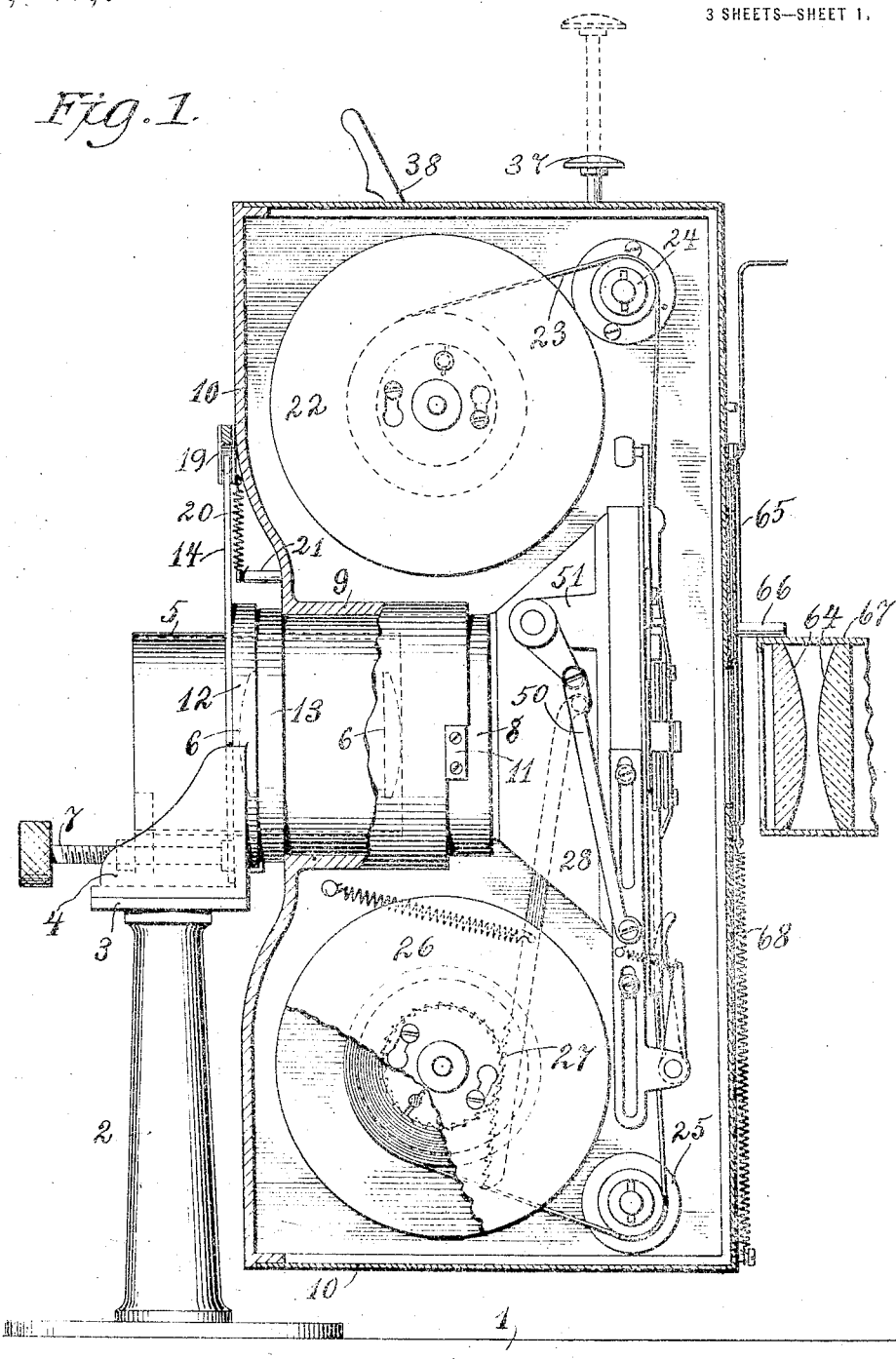

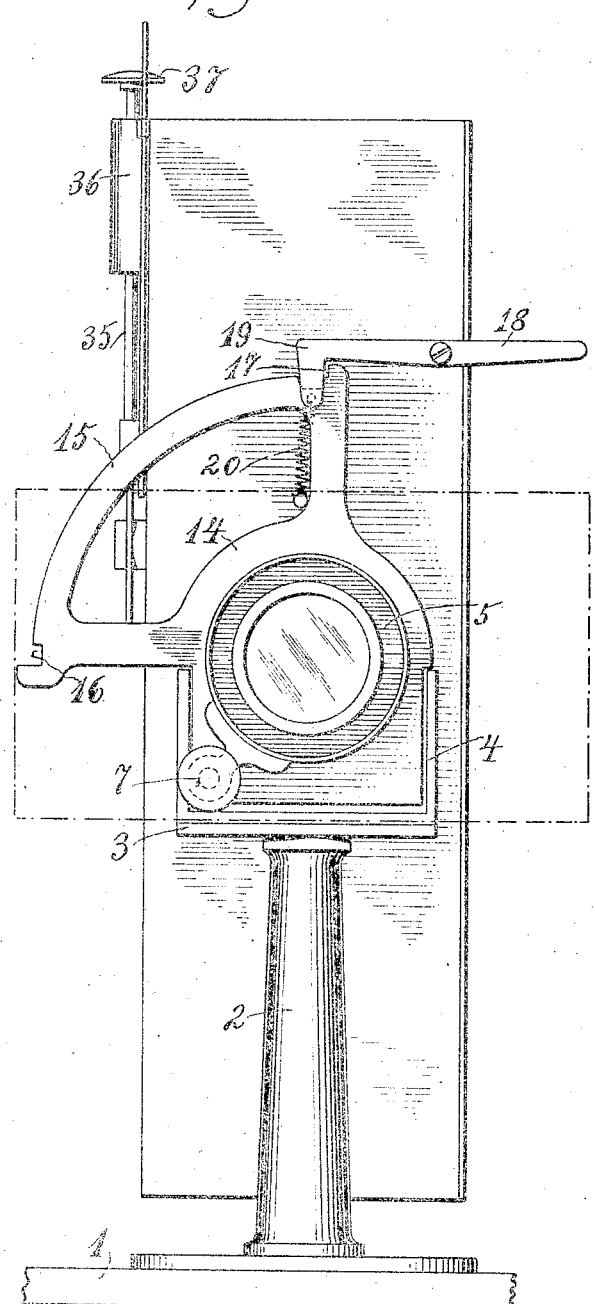
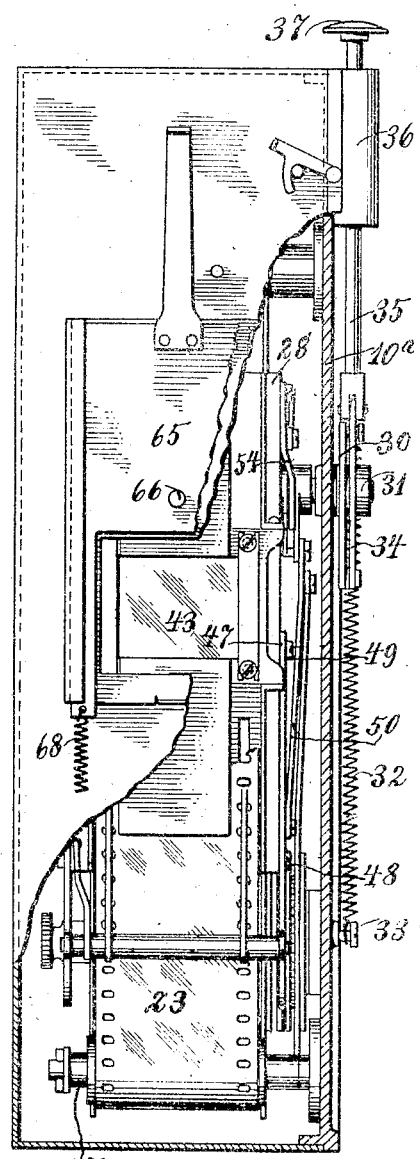

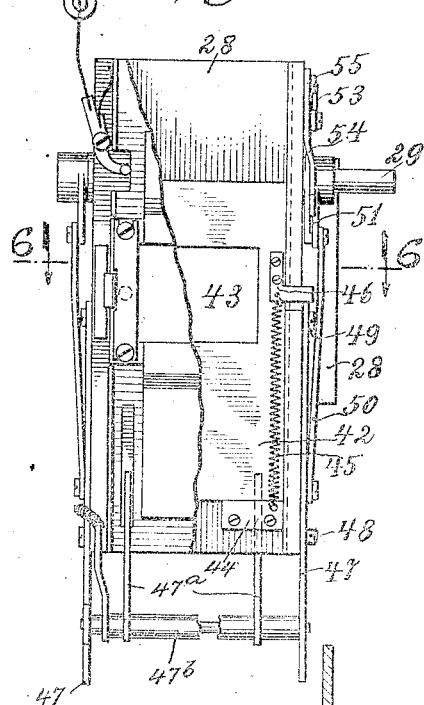
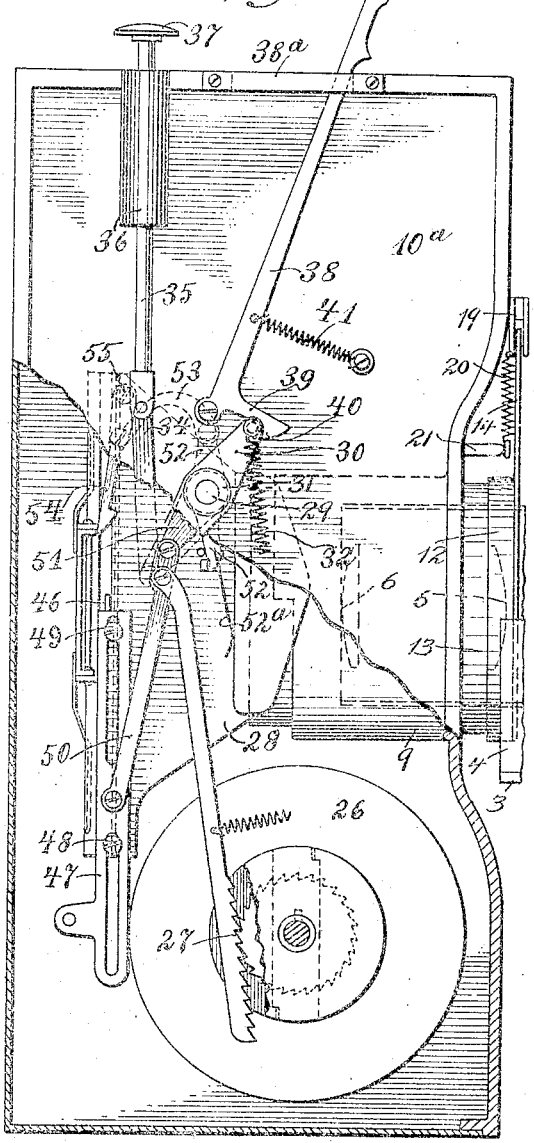

PAUL DIETZ, OF BROOKLYN, NEW YORK, ASSIGNOR, BY MESNE ASSIGNMENTS, TO DEFIANCE MANUFACTURING COMPANY, OF SUMMERDALE, PHILADELPHIA, PENNSYLVANIA.

PROJECTING APPARATUS.

1,199,733.

Specification of Letters Patent. Patented Sept. 26, 1916.

Application filed August 7, 1913. Serial No. 783,469.

*To all whom it may concern:*

Be it known that I, PAUL DIETZ, a citizen of the Empire of Germany, and a resident of Brooklyn, county of Kings, and State of New York, have invented certain new and useful Improvements in Projecting Apparatus, of which the following is a specification.

This invention has reference to novel projectors or projecting apparatus for throwing images on a screen by means of a suitable source of light mounted in the rear. It pertains particularly to a novel projecting apparatus which is adapted to throw images on the screen from a film containing both upright and horizontal pictures and may also be used for square pictures. A novel shutter mechanism and indicator are provided for these purposes.

Assuming that the operator taking pictures with a photographic camera has a new film therein and takes pictures of any interesting objects, then it happens that, in the one instance, he takes one or more pictures with the objects thereon in their normal upright position. Should, however, very long objects, such as towers, churches, high trees and the like be taken, same would not be found completely on such picture and the photographic camera is turned in the usual manner, so that a picture is taken with the object thereon in a horizontal position. One or more of each kind of pictures may be taken which are all contained on the one film in irregular order. If these pictures shall be reproduced on a screen they certainly would appear thereon partly in their normal upright position and partly in an abnormal horizontal position, which would divert attention and spoil the entire effect.

It is the purpose of the present invention to produce projecting apparatus which may be used for throwing the images on the screen always in the normal upright position no matter whether the object of the picture on the film is found thereon in a normal or horizontal position. Accordingly, means are provided for adjusting the projecting apparatus so as to attain the described purpose. To prevent mistakes in adjusting the projecting apparatus, an indicator is provided which calls the attention of the operator to the described adjustment always one picture ahead of time.

Heretofore projecting apparatus were constructed requiring a number of operations for setting or adjusting them. The present projecting apparatus works entirely automatic by the mere touch of a button with mechanism in connection therewith that operates automatically the novel shutter, the indicator and moves the film.

In projecting apparatus a film portion remains in the fixed position for throwing an image on the screen for a relatively long time, while the operator or lecturer makes explanations. In moving picture machines the films move so rapidly that no ignition or explosion can take place when the projection vertex or focus point is on the film. In projecting apparatus the film, being in one position for a certain time, can not be in the plane of the focal point but must be in a plane at a distance therefrom between said point and the lens or objective. However, when for a certain reason, the source of light or lamp is moved out the focal point would strike the film and explode it. To prevent this, an automatic closing device is provided on the apparatus casing which is operated by the movement of the lamp. In addition to these main objects, care has been taken to produce a neat and desirable apparatus, all as will be fully described hereinafter with reference to the accompanying drawings in which:

Figure 1 represents the casing in longitudinal side elevation, with the casing in section, a projecting apparatus embodying in desirable form the present improvements. Fig. 2 is a front elevation of the projecting apparatus shown in Fig. 1. Fig. 3 is a rear elevation of the same partly broken away. Fig. 4 is a longitudinal elevation of the opposite side of the projecting apparatus shown in Fig. 1, with the lower portion broken away. Fig. 5 is a detail view of a shutter mechanism and adjoining parts. Fig. 6 is a cross-section on line 6—6 of Fig. 5. Fig. 7 illustrates in detail one form of an automatic indicator. Fig. 8 represents a film portion showing a picture with the objects thereon in normal upright position, and a picture with the objects thereon in horizontal position.

Similar characters of reference denote like parts in all the figures.

In the drawings, 1 represents a base board upon which is securely mounted a post or standard 2. This post carries a top plate 3 to which a frame 4 is permanently attached. This frame supports the projecting tube 5 that carries the lenses 6 shown in dotted lines in Fig. 1. The projecting tube 5 is adjustable by means of the set screw 7. On the inner wider portion 8 of the projecting tube 5 there is mounted a slidable tube 9 which forms an integral part of the casing 10 of the projecting apparatus. The tube 9 acts as a trunnion or swivel-joint and permits of turning the entire projecting apparatus on the axis of said swivel-joint. The apparatus is turned 90° at a time for a purpose to be described hereinafter. In order to turn just 90° and no more, stops are provided on the inner wide tube portion 8 of the projecting tube 5 of which one stop 11 is shown in Fig. 1. To render the turning of the apparatus entirely secure, the frame 4 extends into a ring 12 and adjoining somewhat smaller ring 13 is formed thereon whose inner surface acts as a guide for the casing 10 while being turned. The portion of the casing adjoining the swivel 9 is reduced in diameter so as to make room for the rings 12 and 13. A guide member 14 is secured to the ring 12 by small screws or the like, which member forms a sector 15 at its outer end having two end incisions 16, 17. For the purpose of further guiding the casing and locking it in a turned position there is provided a pivotally mounted lever 18 above the segment 15. This lever has a downward extension 19 with interior slot in its lower portion. The slotted end portions of this extension overlap part of the sector 15 and when the casing is turned said extension moves along said sector. The inner flange of the extension 19 carries a spring 20 secured below to a stud 21 on the reduced portion of the casing. This spring normally draws the inner portion of the lever 18 in a downward direction and when, at the end of the turning of the casing, the extension 19 reaches one of the incisions 16, 17 of the sector 15 said extension snaps in and remains so until the force of the spring 20 is overcome by pressing down the outer end of the lever 18.

The location of the sector 15 of the guide member 14 is such that the projecting apparatus may assume a vertical and horizontal position when turned 90° in one or the other way.

The moving mechanism of the film is substantially the same as described in my copending application, Cameras, Ser. No. 726,643, filed Oct. 19, 1912, except to note that the shutter mechanism is of novel construction. The moving mechanism comprises a reel 22 from which the film 23 passes over a roller 24 through the film guide around another roller 25 and then on a reel 26 on which it is wound. The reel 26 is provided with an automatic ratchet mechanism 27 for taking up the slack of the movement of the film. The shutter is so constructed that it opens automatically when a desired film portion with a picture is in the proper position before the opening and any length of exposure may be had. This is effected by pushing a button on a rod and mechanism connected thereto. A release lever returns the mechanism into its initial position and closes and tensions the shutter automatically. By pressing the button again a new film portion with picture is placed before the opening, but the shutter is not released until the new picture is in the exact position. The shutter mechanism is mounted on an angular support or bracket 28. The bracket 28 is secured to the wall 10ᵃ of the camera casing by means of an inner protruding side flange. A shaft 29 is supported in the upper portion of the bracket 28 and extends through the wall 10ᵃ of the casing 10. A lever 30 is connected to the shaft 29 and secured by a bushing 31. The inner end of the lever 30 is connected with a spring 32 which extends vertically down along the wall 10ᵃ of the casing and the other end of said spring is secured by means of a screw 33. The second end of the lever 30 is articulated to a link 34 whose upper end is movably connected to the rod 35 passing through an integral casing portion 36 and having a button 37 at its top. When the button is pressed down, as shown in Fig. 3, the inner end of the lever 30 moves upward on the shaft 29 and the spring 32 is tensioned. To keep the described mechanism in the tensioned position, a lever 38 is pivotally secured with its lower end to the wall of the casing adjoining the lever 30. This lever has a side arm 39 with catch 40. The catch engages the inner end portion of the lever 30, as shown in Fig. 4. A spring 41 retains the lever in the described position. When it is desired to relieve the mechanism operated by the button, the lever 38 is simply moved inward until it releases the lever 30 whereupon it is drawn back into its initial position by the spring 41.

The face portion of the bracket 28, Figs. 5 and 6, is so constructed that the shutter plate 42 may slide up and down thereon. This plate has the shutter opening 43 which during exposure coincides with a like opening in the face portion of the bracket. A stop plate 44 limits the downward movement of the shutter plate. A spring 45 is secured with its lower end to the stop plate 44 while the upper end of this spring is connected to a rectangular bracket 46 fixed to the shutter plate. The rectangular horizontal arm of this bracket is adapted to slide along the upper recessed side portion of the bracket 28 and rests on a slide 47 having two slots and sliding on two screws 48, 49 on the side of the bracket 28. The slide 47 has pivotally secured thereto a lever 50 which extends upward and connects with a short link or lever 51 rigidly secured to the shaft 29. As previously stated, the shaft 29 supports the mechanism operated by the button 37. When the button is in its top or released position, as shown in Fig. 1, the shutter is closed and in tension and held in this condition by means of a catch operated by the shaft 29. This catch consists of a lever 52 mounted on the shaft 29 and has a curved vertical extension 53 which is pivotally connected to a lever 54 secured with its top to the top side end of the bracket 28 by means of a pivot 55. This lever has an inward catch on which rests the horizontal portion of the shutter bracket 46, when the button 37 is released and in its high position. Upon pushing the button down the lever 50 moves downwardly and takes along the slide 47 with the fingers 47$^a$ and the shaft 47$^b$ whereby the film is moved downwardly, but the shutter remains closed because the horizontal portion of the bracket 46, is held in its upper position by the catch of the lever 54. The inner lever 52 of this catch has on its lower portion below the shaft 29 an inward extension with stop pin and spring 52$^a$ at its end and when the film portion with a new picture has reached the shutter opening, then the lever 51 has reached the pin and forces the catch mechanism inwardly whereby the lever 54 is moved away from the horizontal arm of the shutter bracket 46, by means of the curved lever 53, thus releasing the shutter which now is drawn down by the shutter spring 45 until its lower end strikes the stop plate 44. Now an image is thrown on the screen for as long a time as desired. To show a new picture the release lever 38 is operated whereupon the button mechanism is released, the shutter closed and tensioned and the button 37 returned in its upper position. If now the button is pressed down again the described cycle of operations is automatically repeated and a new picture shown. To insure the safe movement of the lever 38 a guide strip 38$^a$ is provided on the top of the camera casing, as shown in Fig. 4.

As hereinbefore stated, the film contains pictures with the objects thereon in the normal upright position and pictures with long objects thereon in the horizontal position. In order to throw the images of the pictures with the objects in the horizontal position on the screen in the normal upright position, the projecting apparatus is turned 90° by virtue of the mechanism previously described. To call the operator's attention to the necessity of turning the projecting apparatus, an indicator is provided which is automatically operated by the film when the latter is automatically moved. This indicator is actuated always before such picture reaches the shutter opening. Various indicators may be used. On the drawing one indicator is illustrated consisting of an alarm arrangement.

When the positive film is finished, the usual openings 56 near the edges are provided and incisions 57 are made on the side where the indicator is located. Such incision actuates a lever 58 mounted on a pivot 59. This lever has at the bottom an inward portion 60 with end pin 61 along which the film moves with the adjoining edge portion. However, when an incision 57 passes the pin 61 said pin enters the incision and causes the head or clapper 62 to perform a movement toward the left striking an electric alarm indicated by a contact 62$^a$, see Fig. 7. A spring 63 may be provided on the lever 58 to insure the reliable working of the indicator. The head or clapper 62 may establish an electric contact, which lights a miniature electric lamp for a moment or rings an electric bell, or exhibits a sign on the outside of the apparatus. For square pictures with the objects thereon in the normal upright position, no indicator is necessary, but the novel bracket shutter release which contains but one shutter is required. The indicator solely serves for calling the attention of the operator to the necessity of turning the projecting apparatus before a picture with the objects thereon in horizontal position reaches the shutter opening. The apparatus casing, of course, is fireproof.

When the source of light or lamp is in its normal position close to the camera, no danger of igniting the film exists because the film is not located in the plane of the focal point. Assuming that circumstances arise which require that the lamp be moved out or taken away, then at a certain moment the focal point of the lenses 64 would be on the film and the film would explode. To prevent this the rear wall of the camera casing has a shutter 65 which is automatically operated by the moving out of the lamp. The shutter is provided with a pin 66 which rests on the top of the lens casing 67 during the operation of the projecting apparatus. If the lamp is withdrawn and has passed the pin 66, the shutter slides down by gravity and closes the opening. To render this operation secure, a spring 68 is attached to the lower end of the shutter 65 which draws the shutter downward when the pin 66 has been released. This spring is not absolutely necessary when the projecting apparatus is in the normal upright position, because the shutter will slide down by gravity. However, when the projecting apparatus has been turned 90° and is in the horizontal position, the spring is required to move the shutter in the horizontal plane.

I claim as my invention:

1. A projecting apparatus comprising a projecting tube, a casing forming an integral tube slidable on the inner portion of the projecting tube, inner film supporting mechanism rigidly connected to the casing, a film on its supports with pictures having the objects partly in the normal upright and partly in a horizontal position, means on the camera for turning it 90° to exhibit all the pictures in the normal upright position, and means for feeding the film.

2. A projecting apparatus comprising a camera with a casing, inner film supporting mechanism rigidly connected to the casing, a film on its supports with pictures having the objects partly in the normal upright and partly in a horizontal position and incisions in one edge portion, means for feeding the film, an indicator actuated by the said incisions when the film is moved, and means on the camera for turning it 90° to exhibit all the pictures in the normal upright position.

3. A projecting apparatus comprising a camera with a casing, inner film supporting mechanism rigidly connected to the casing, a film on its supports with pictures having the objects partly in the normal upright and partly in a horizontal position and lateral incisions in one edge portion, means for moving the film to place a picture in exact position for projection, an indicator actuated by the film incisions, and means on the camera for turning it 90° to exhibit all the pictures in the normal upright position.

4. A projecting apparatus comprising a camera with a casing, inner film supporting mechanism rigidly connected to the casing, a film on its supports with pictures having the objects partly in the normal upright and partly in a horizontal position and lateral incisions in one edge portion, means for moving the film to place a picture in exact position for projection, an indicator comprising a pivotally mounted spring actuated bar, a head on said bar, and a pin at its bottom adapted to lodge in an incision of the film whereby the indicator is operated, and means on the camera for turning it 90° to exhibit all the pictures in the normal upright position.

5. A projecting apparatus comprising a camera with a casing, inner film supporting mechanism rigidly connected to the casing, a film on its supports with pictures having the objects partly in the normal upright and partly in a horizontal position and lateral incisions in one edge portion, means for moving the film to place a picture in exact position for projection, an indicator with bottom pin on which the perforated film edge slides and actuated when the pin enters a film incision, button actuated means for moving the film automatically, and a shutter mechanism operated automatically by the means for moving the film.

6. A projecting apparatus comprising a camera with a casing, inner film supporting mechanism rigidly connected to the casing, a film on its supports with pictures having the objects partly in the normal upright and partly in a horizontal position and lateral incisions in one edge portion, means for moving the film to place a picture in exact position for projection, an indicator with bottom pin on which the perforated film edge slides and actuated when the pin enters a film incision, button actuated means for moving the film automatically, a shutter mechanism operated automatically by the means for moving the film, and a shutter release operated thereby when a picture is in exact position for projection.

7. A projecting apparatus comprising a camera with a casing, inner film supporting mechanism rigidly connected to the casing, a film on its supports with pictures having the objects partly in the normal upright and partly in a horizontal position and lateral incisions in one edge portion, means for moving the film to place a picture in exact position for projection, an indicator with bottom pin on which the perforated film edge slides and actuated when the pin enters a film incision, button actuated means for moving the film automatically, a shutter mechanism operated automatically by the means for moving the film, a shutter release operated thereby when a picture is in exact position for projection, and means for automatically closing the rear opening of the camera when the lamp is removed.

8. A projecting apparatus consisting of a base, a camera with film and shutter release therein mounted on the base, means for placing the camera in a vertical and a horizontal position during operation to properly exhibit vertical and horizontal objects on succeeding film pictures, a button operated mechanism for automatically moving the film and releasing the shutter when a new picture is in exact position for projection, and a locking and release device for said button operated mechanism to lock and return it into its initial position tensioning the shutter and raising the button.

9. A projecting apparatus consisting of a camera, film moving mechanism therein, a shutter release, a button with a supporting rod on one side of the camera, and mechanism in connection with said rod, film moving mechanism and shutter release adapted to automatically move the film when the button is depressed and release the shutter when the film has been moved so far that a new picture is in exact position for projection.

10. A projecting apparatus consisting of a camera, film moving mechanism therein, a shutter release, a button with a supporting rod on one side of the camera, mechanism in connection with said rod, film moving mechanism and shutter release adapted to automatically move the film when the button is depressed and release the shutter when the film has been moved so far that a new picture is in exact position for projection, and locking and release mechanism for the button operated mechanism to lock the same and return it into its initial position tensioning thereby the shutter and raising the button.

11. A projecting apparatus consisting of a supporting base, a standard thereon, a camera on said standard, a film therein with pictures having vertical and horizontal objects thereon, a shutter release, a button actuated mechanism for automatically moving the film and releasing the shutter when a new picture is in exact position, a locking and release mechanism for said button actuated mechanism, and means on the camera and standard for turning the camera 90° around the axial line of the lenses for properly exhibiting all film pictures.

12. A projecting apparatus consisting of a camera, a film with pictures therein, mechanism for moving said film, a shutter release, a button operated device for automatically moving the film and releasing the shutter when a new picture is in exact position, and a locking and release device for said button operated mechanism to tension the shutter and raise the button.

Signed at New York, N. Y., this 30th day of July, 1913.

PAUL DIETZ.

Witnesses:
 MARIE LEAHY,
 SARA M. ONNAN.